US011735892B2

(12) United States Patent
Rusch et al.

(10) Patent No.: US 11,735,892 B2
(45) Date of Patent: Aug. 22, 2023

(54) UNIVERSAL COVER

(71) Applicant: National Diversified Sales, Inc., Woodland Hills, CA (US)

(72) Inventors: David Rusch, Springville, CA (US); Roberto Orozco, Merced, CA (US); Ryan Larsen, Visalia, CA (US)

(73) Assignee: National Diversified Sales, Inc., Woodland Hills, CA (US)

( * ) Notice: Subject to any disclaimer, the term of this patent is extended or adjusted under 35 U.S.C. 154(b) by 0 days.

(21) Appl. No.: 17/496,181

(22) Filed: Oct. 7, 2021

(65) Prior Publication Data

US 2023/0112310 A1  Apr. 13, 2023

(51) Int. Cl.
 *H02B 1/00* (2006.01)
 *H02B 1/50* (2006.01)
(52) U.S. Cl.
 CPC ........................................ *H02B 1/50* (2013.01)
(58) Field of Classification Search
 CPC ....................................................... H02B 1/50
 See application file for complete search history.

(56) References Cited

U.S. PATENT DOCUMENTS

| | | | | |
|---|---|---|---|---|
| 3,674,149 A | * | 7/1972 | Donalson | E03F 5/0407 210/163 |
| 7,559,717 B2 | * | 7/2009 | Salas | E03B 7/095 404/25 |
| 8,784,000 B2 | * | 7/2014 | Reynolds | E02D 29/1436 404/25 |
| 9,518,369 B2 | * | 12/2016 | Ducote | E02D 29/1409 |
| 2015/0162948 A1 | * | 6/2015 | Restivo | H04B 1/3888 455/575.8 |

* cited by examiner

*Primary Examiner* — Pete T Lee
(74) *Attorney, Agent, or Firm* — Fulwider Patton LLP (57) ABSTRACT

A plate having an upper surface and a lower surface, a center point, and an outer perimeter. It further includes a plurality of clips for temporarily securing the plate in an opening in a landscape box. Each of the plurality of clips comprises a limb, extending vertically downward, the limb having the form of a rectangular plate and being upper bound by an upper edge and lower bound by a lower edge, wherein the upper edge is attached to the lower surface of the plate. The limb further includes a foot extending horizontally sideways from the lower edge.

10 Claims, 8 Drawing Sheets

UNIVERSAL COVER

BACKGROUND

This disclosure relates generally to the field of underground landscape boxes which are used by many industries as a means for housing various types of components in a box located in a subterranean setting. These boxes typically have an access cover on an upper surface of the box, positioned on ground surface level for easy access. Underground landscape boxes are used almost exclusively in earth landscape but can be used in a number of other areas such as concrete surfaces. These underground landscape boxes may house electrical connections, electric valves, water shut-off valves, or cable TV connections. These examples are just a few of the many and varied applications.

As underground landscape boxes have grown in use over the years, ever more manufacturers have entered the market, each making their own box with a unique size and specification. The uniqueness of each box can be seen in box circumference. Although boxes are generally referred to by class, such as "econo-box," the circumferences available in such a class may vary about a certain standard diameter by up to half an inch either way. For example, an "econo-box" by different manufacturers might be found to have a diameter of 6.5 inches plus or minus half and inch, and a "space-box" by different manufacturers might be found to have a diameter of 10 inches plus or minus half and inch. This difference in circumference for boxes falling into the same class means the corresponding cover will vary in its diameter by different manufacturers resulting in as many cover closure sizes as there are manufacturers.

Over time, as countless underground landscape boxes have been installed, the covers are subject to needed replacement from deterioration, or removal by vandalism or accidental removal during nearby construction. When the end user needs to replace missing covers, they are often forced to dig up the entire underground box body and replace the box with whatever manufactured brand their local wholesaler or retailer might be carrying in any particular year.

The wholesaler and retailer arbitrarily change manufacturers over time due to better pricing, better warranty, or rebate incentives. As ever more manufacturers have entered into the same markets, wholesalers and retailers are forced to make the following inventory decisions based on replacement market sales. First alternative decision: carry multiple manufactured lines of underground landscape boxes thereby increasing inventory levels. Second alternative decision: carry only one line of underground landscape boxes and lose replacement sales to their competitors.

A number of solutions have emerged in an attempt to create more alternative options. One alternative involved solving broken covers by placing an insertion device such as a new flange inside the underground box wall. This then allowed a smaller cover to be used on the box. But different problems were created. By using an insertion device and then a replacement cover, this (a) created two parts, and two stock keeping units for the wholesaler or retailer to inventory, and (b) it involved using a smaller cover.

Others have attempted to create a cover that can be used, alone, with all—or at least a large set of—manufactured products on the market today, or that may be manufactured in the future. However each of these attempts at a solution has thus far introduced some other problem that did not exist in the original product. For example, some have created leaves that bend in a plane with direction of movement parallel to the plane of the cover, rather than perpendicular to the plane of the cover. These expand outwardly, and provide a frictional or detent attachment to the wall of the box. While these may solve the problem of attaching to the interior of an underground box after the cover has been inserted, it is initially difficult to bend all the leaves simultaneously to permit insertion of the leaves into the opening of the box, and even more difficult to depress all the leaves simultaneously to enable removal. Yet others have attempted a solution that has been to supply a plurality of clips each configured to have a saw tooth edge having multiple serrations. However, these multiple serrations make it difficult to remove the cover.

No prior technology presently makes a replacement cover that can be used as closure for most manufactured products on the market today or for future manufactured product. The present invention addresses these and other needs.

SUMMARY OF THE INVENTION

In a preferred embodiment, the invention is a universal cover for covering an opening in a landscape box. The universal cover comprises a plate having an upper surface and a lower surface, a center point, and an outer perimeter. It further includes a plurality of clips for temporarily securing the plate in an opening in a landscape box. Each of the plurality of clips comprises a limb, extending vertically downward, the limb having the form of a rectangular plate and being upper bound by an upper edge and lower bound by a lower edge, wherein the upper edge is attached to the lower surface of the plate. The limb further includes a foot extending horizontally sideways from the lower edge, and having the form of a quadrilateral plate with an upper surface and a lower surface, and being inner bound by an inner edge and outer bound by an outer edge. The inner edge is connected to and coincident with the lower edge of the limb. The outer edge is positioned a first distance from the center point and the inner edge is a second distance from the center point, the first distance being greater than the second distance.

In some preferred embodiments, the limb has a vertical length of between 1.5 and 2.0 inches in length. In further embodiments, the foot has a horizontal length measured along a radial line, of between 0.8 inches and 1.2 inches. In yet further embodiments, the limb has a thickness that is between 0.1 inches and 0.2 inches. And in yet further embodiments, the outer edge has a first length and the inner edge has a second length, wherein the first length is between 40%-60% of the second length.

In some preferred embodiments, the plate is circular and the plurality of clips is three and only three in number. In further embodiments, the upper edge of the limb of each of the plurality of clips lies on a single circumferential imaginary line that has the center point in common. Under this configuration, a center point on the outer edge lies on a first radial line of the circular plate, and a center point of the inner edge lies on a second radial line of the circular plate, and wherein the first radial line is offset between 10 degrees and 15 degrees from the second radial line.

In yet further preferred embodiments, stiffening ribs may be molded onto the lower surface of the plate, wherein the stiffening ribs are spaced apart from the plurality of clips to an extent that permits the plurality of clips to bend during installation of the cover without contacting any part of the stiffening ribs.

In further preferred embodiments, the foot is bounded by a first side edge and a second side edge, wherein the first side edge is not parallel with the second side edge, and the first side edge and the second side edge intersect at an imaginary point outside the outer perimeter of the plate.

In further embodiments, the lower edge includes a downwardly projecting protrusion which extends below the lower surface of the foot by a certain distance, wherein the certain distance is between ¼ inch and ¾ inch. Under this configuration, the downwardly projecting protrusion may have a sloping surface which is exposed facing away from the center point of the plate, wherein the sloping surface is angled at between 40 degrees and 50 degrees from the vertical.

Other objects, features and advantages of the present invention will be apparent when the disclosure is considered in conjunction with the drawings set forth herein, which should be construed in an illustrative and not limiting sense.

BRIEF DESCRIPTION OF THE DRAWINGS

The present invention is described in detail below with reference to the attached drawing figures, wherein.

Reference will hereinafter be made to the drawings in which similar elements in different drawings bear the same reference numerals.

DETAILED DESCRIPTION OF THE PREFERRED EMBODIMENTS

In the following detailed description, certain preferred embodiments are described in order to provide a thorough understanding of the present invention.

Structure.

In one embodiment, as exemplified in the figures, the invention is a planar cover 10 which includes features for universal attachment to variously sized openings in landscape boxes. In the shown embodiment, the cover comprises a circular plate 12 having a top surface 14 and a bottom surface 16 and configured for closing a circular opening in a landscape box. In other embodiments, the cover may comprise a rectangular plate, configured for closing a rectangular opening in a rectangular box.

In the disclosed embodiment, the bottom surface is reinforced with stiffeners 18 in the form of embossed ribs protruding from and extending circumferentially and radially on the bottom surface. The embossed ribs may be added during the process of forming the cover by a known process of molding, preferably from a flexible polymer such as HDPE (high-density polyethylene). These stiffeners strengthen the plate 10 so that a heavy load, for example the weight of a person or even a small vehicle, may be sustained on the top surface when the perimeter of the plate is supported from below.

An additional feature of the cover 10 of the shown embodiment is the inclusion of three angled clips 20 which are attached to the bottom surface 16 of the plate 12, each clip being an equal distance from the center of the plate 12 and symmetrically arranged with respect to the center, at 120 degree intervals. Structural features of the clips 20 that provide the functional advantage of the invention may be described as follows.

As may be seen in the figures, the clips 20 are not attached to the ribs 18. Rather, the ribs are configured to attach directly onto the bottom surface 16—preferably in a molding process. The ribs are arranged to extend to bypass the base of the clips, with a substantial space provided between the clips 20 and the ribs 18, so that when the clips are made to bend for installation and/or removal (as will be described), they will not come into contact with the ribs 18. This feature allows free cantilevered flexion by the clips as an advantageous part of the invention. Further, because the clips are not directly attached to the ribs 18 but to the bottom surface 16 of the plate 12, then, for a given distance between the bottom surface and the lowest extent of the clips, the clips are given the longest possible length. Again, this is advantageous for the desired cantilevered flexibility of the clips, as will be further described herein.

Each clip 20 comprises the following elements: A vertically extending limb 22 which extends from the bottom surface 16 directly downwardly for a distance whose precise dimension will be further defined. (The directions downwardly, upwardly, horizontally, and sideways are defined in relation to the orientation of the figures, that all show the upper surface 14 at the top of the figures.) In a preferred embodiment the vertically extending limb 22 may have the form of a flat plate (as seen from a horizontal side view) with an aspect ratio of between 1 and 2. The vertical limb 22 may be defined by two opposite vertical edges 24, 26, an upper horizontal edge 28, a lower horizontal edge 30, and a radially outer surface 32 and a radially inner surface 34. The upper horizontal edge 28 of each plate is attached to the bottom surface 16 of the plate 12 thereby to extend along a common circumferential line with a center point that coincides with the center of the circular plate. In the preferred embodiment, each clip is thus positioned symmetrically around the plate 12, with three lines of symmetry separated by 120 degrees.

Attached to each vertically extending limb 22 is a horizontally extending foot 40. The horizontal foot is configured to form a flat horizontal plate extending horizontally at a right angle to the vertical limb 22. The shape of the horizontal foot 40 (as seen from above or below and best seen from below in FIG. 5) is, in a preferable embodiment, not rectangular but has a quadrilateral "offset" configuration as follows. Under this configuration the foot is defined by two horizontal side edges 42, 44 which in a preferred embodiment are not parallel with one another; a horizontal inner edge 46 that joins continuously with the horizontal lower edge 30 of the vertical limb 22, and; a horizontal outer edge 48 which is a radially terminal edge of the foot 40. As may be best understood with reference to FIG. 5, the two horizontal edges 42, 44 may be configured so that they do not extend parallel with each other; rather, each may extend in a straight line such that the straight lines, when extended, intersect with each other at a point Q1 located outside the perimeter of the plate 10, to form an angle of between 20 degrees and 30 degrees. Thus, the horizontal plate 40 may converge on a horizontal outer edge 48 that is shorter than the horizontal inner edge 46, giving the foot a pinched appearance towards the outer edge. Further, the foot is given an offset configuration, in which the centerline of the foot 40 extends sideways at an angle (shown as angle β in FIG. 5) between 30 degrees and 50 degrees to a radial line extending from the center point of the plate 12. The functional advantage of this geometry will be explained further below.

Figure 8:
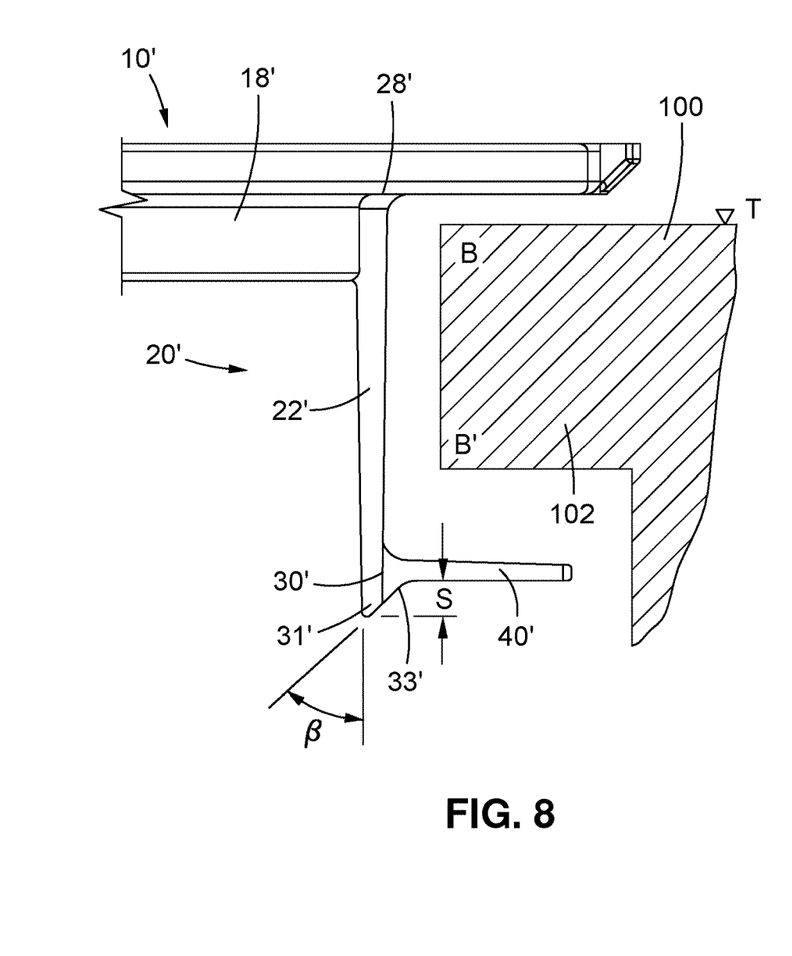
FIG. 8 is the view shown in FIG. 6, but with an alternative embodiment of the clip.
Figure 9:
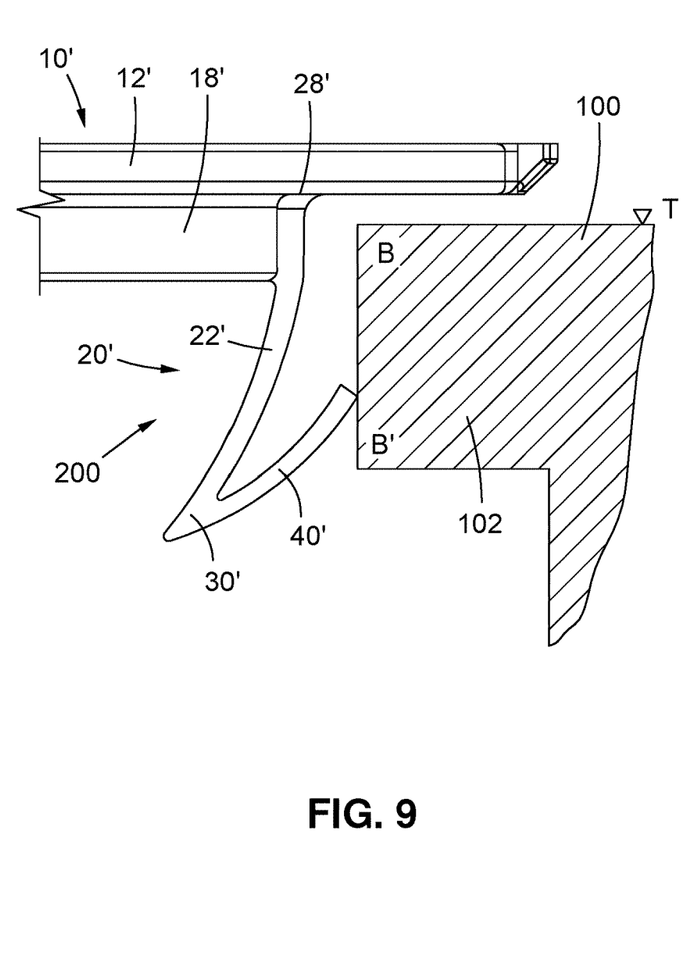
FIG. 9 is the view shown in FIG. 8, but with a portion of the cover shown in a bent upwardly condition during installation.

In an alternative embodiment, certain elements of the invention are marked in the figures with a single "prime" to show the alternative element corresponding to the original embodiments. This alternative is seen in FIG. 8 and FIG. 9. The primary element which has been changed here is the shape of the lower horizontal edge, now shown as element 30'. As seen, the lower horizontal edge 30' in the alternative embodiment now has a "heel" which joins the vertically extending limb 22' to the foot 40'. The shape of the lower horizontal edge or heel 30' provides a protrusion 31' which extends below the lower surface of the foot 40' by a distance "S" as seen in FIG. 8. Preferably, the length of "S" is between ¼ inch and ¾ inch. An additional aspect of the protrusion 31' is that is presents a sloping surface which is exposed facing away from the center of the plate 10'. The sloping surface 33' is angled at an angle β to the vertical, as seen in FIG. 8, which is preferably between 40 degrees and 50 degrees. The functional advantage provided by this alternative embodiment of the horizontal edge 30' and protrusion 31' will be explained further below.

In Use

Figure 6:
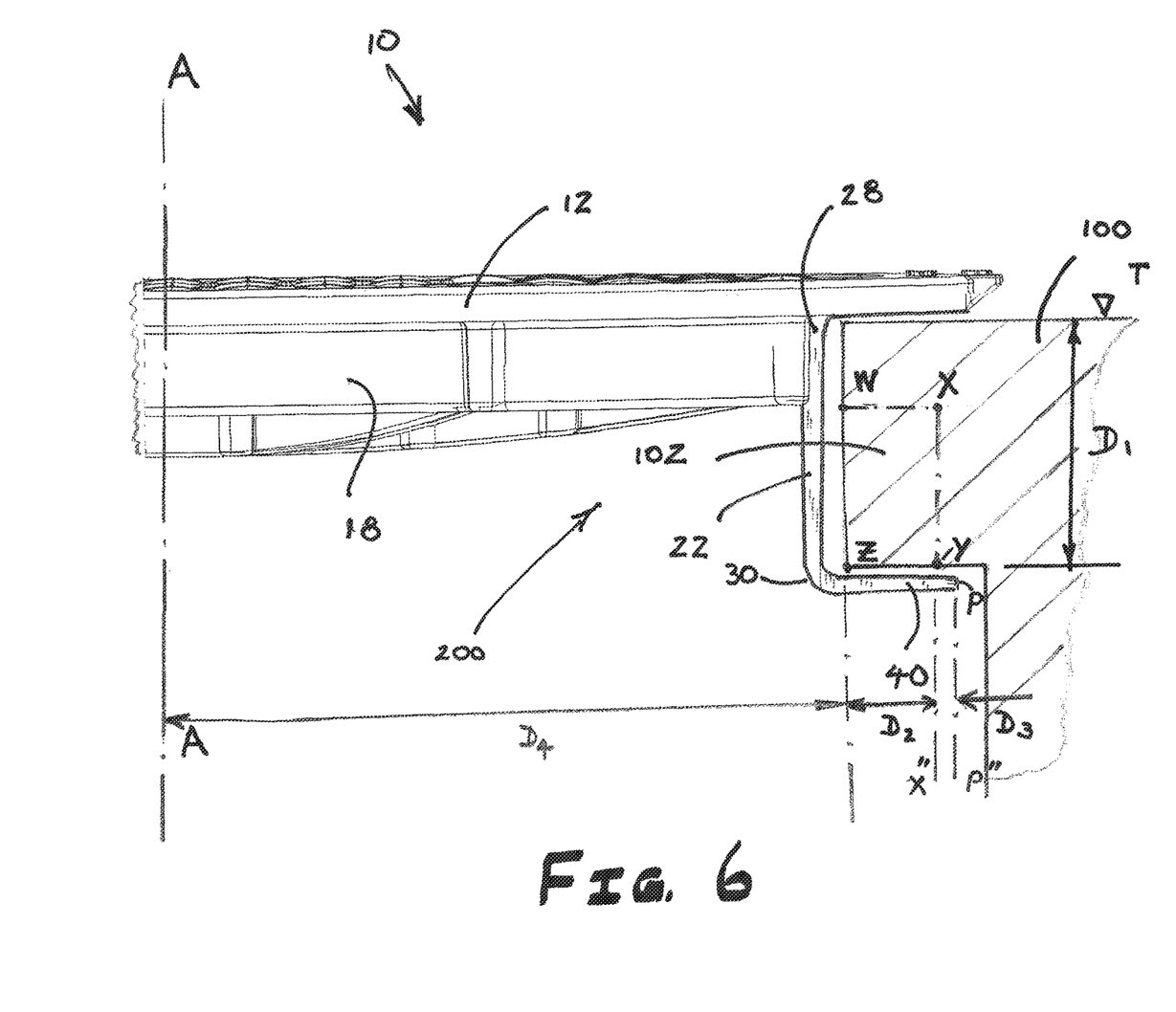
FIG. 6 is a detail side view of an aspect of FIG. 4, with the cover shown in a normal condition clipped onto a flange of a landscape box; the landscape box is shown in partial view which is a sectional view; for clarity the cover is not shown in sectional view but in side view.

In use, the universal cover 10, as disclosed in the figures and as described above, is configured to solve the following functional problem: With reference to FIG. 6 it is seen that almost every landscape box 100 (of which only the critical part is shown, in sectional view) possesses an internal flange 102 which is shaped to possess a lower corner which is identified in FIG. 6 by the letter "Z" in relation to the centerline A-A of the box 100. It is this corner that must be used to secure the cover 10 to the landscape box 100, by inserting a clip on the cover in some form into the opening 200 of the box to snag below the corner Z so that the cover rests on the upper surface T of the box and cannot be removed from the box without the application of a significant force to remove the cover 10. The prior art is full of various different types of clips with various shapes that have been developed over the years. However, as mentioned above, a problem exists for the prior art, and remains to be overcome, because the corner "Z" is not in the same location (in relation to the centerline A-A of the box) for each of the many styles of landscape box that have been placed on the market.

In solving the problems in the prior art under the present invention, the first important dimension of the box 100 to focus on is the horizontal distance D4 which is the distance of the corner Z from the center A-A of the landscape box. Over the years, various manufacturers have produced landscape boxes in which the distance D4 for any particular class of box varies between the class mean diameter plus or minus half an inch. The second important dimension to focus on in existing landscape boxes 100 is the vertical dimension D1, which is the vertical distance of the corner Z from the upper surface "T" of the landscape box. Over the years, various manufacturers have produced landscape boxes in which the distance D1 ranges between the class mean depth plus or minus one quarter of an inch. As already noted, these differing box sizes have in the past created a problem when attempting to replace a lost or broken cover in that the original manufacturer of the cover may be out of business, or has failed to place its name on the landscape box for tracking down a replacement cover. Thus, some recent manufacturers have attempted to make a universal cover, that will attach to every (or nearly every) landscape box, of a certain class, that has been made over the years. Nevertheless, as noted above, these attempts at a universal cover have introduced problems of their own.

The present invention, however, differs from the inventions of the prior art, and it solves the problem confronted by other prior universal covers without introducing new problems. The approach taken by the present invention is to recognize that the corner "Z" of a putative box 100, as identified in FIG. 6, may be located, in relation to the center line of the box A-A and the top surface of the box T, anywhere within the imaginary rectangle identified by the letters WXYZ in FIG. 6. As noted above, the distance between Y and Z is a horizontal variation of about one inch that is found to be present in currently available landscape boxes, around the mean (for the particular class of box) from the centerline A-A of the box. The distance between X and Y is a vertical variation of the point Z of about half an inch that is found to be present, in presently available landscape boxes, around the mean depth (for the particular class of box) from the top of the box shown by the level T.

The invention is configured to ensure that any box corner Z (that is located within the rectangle WXYZ in relation to the centerline A-A of the box and the top T of the box) can be securely engaged by the universal cover 10 of the present invention. In order to accomplish this objective, and as already noted above in the structural description, the plate 10 of the described embodiment of the cover is provided with three clips 20, evenly spaced towards the perimeter of the plate and distributed at 120 degrees in the shown embodiment. The dimensions of the clip, in particular the vertical length of the limb 22 and the horizontal length of the foot 40 are selected so that, when the cover 10 is installed on a landscape box 100, at least a portion of the foot 40 will always be positioned beneath the corner Z of the landscape box wherever it may be located within the rectangle WXYZ. In FIG. 6, that portion of the foot is the portion of the foot extending between vertical line X-X" and vertical line P-P" the latter line being a vertical line descending from the tip of the foot, at point P. The distance between these two lines is marked D3 in FIG. 6. If the distance D3 is the only portion of the foot underneath the flange 102, then the portion of the foot marked as D2, in some configurations of the box, may not be positioned under the flange 102 in relation to some landscape boxes. However, the distance D3 has been designed to be sufficient to provide an adequate mechanical vertical connection with the opposing part of the flange 102.

To achieve the result stated in the above paragraph, it has been found that the vertical length of the limb 22 is to be between 1.5 and 2.0 inches in length. Further, the total horizontal length of the foot, when measured along a line drawn directly away from the center line A-A, is preferably between 0.8 and 1.2 inches in length.

Figure 5:
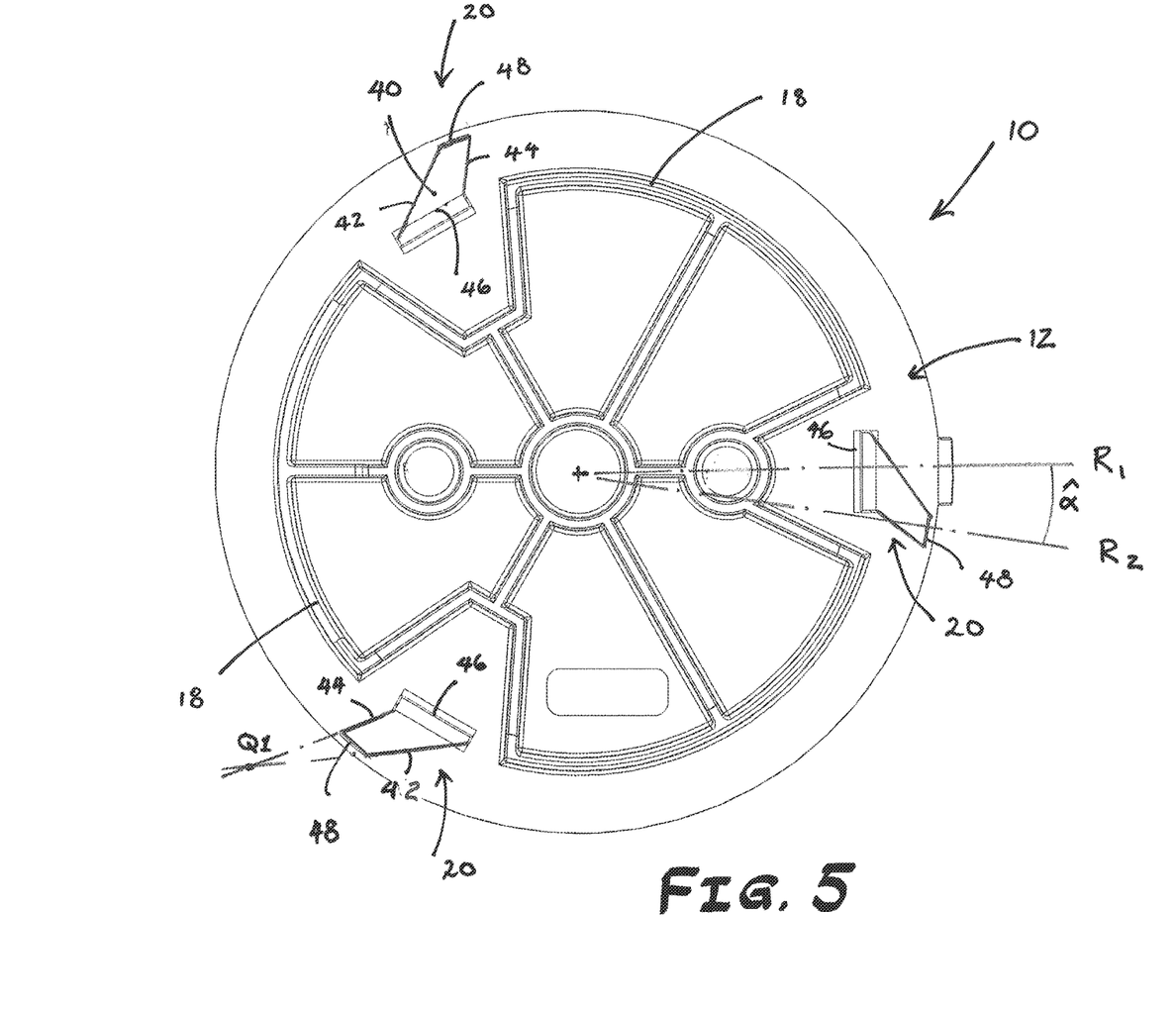
FIG. 5 is a bottom view of a universal cover of the present invention.

In a further structural detail that enhances the operation and provides advantageous effect of the invention, the shape of the foot 40 of a clip 20, as seen from above or below, will here be explained with reference to FIG. 5. As can be seen (and as described above) the shape of each foot 40 discloses an outer circumferential edge 48 and an inner circumferential edge 46. The outer edge 48 and the inner edge 46 are not aligned along a single radial line of symmetry of the cover. Rather, a first radial line R1 passes through the center of the inner edge 46, and a second radial line R2 passes through the center of the outer edge 48. R2 is angularly "offset" from R1 by an offset angle α (shown in FIG. 5) with a magnitude preferably being between 10 degrees and 15 degrees. The effect of the offset is that it results in the foot being longer than it would otherwise have been without the above described offset.

Further, the sides 42 and 44 of the foot 40 are preferably not parallel to each other, but converge on a point (shown at point of intersection Q1) outside of the circular perimeter created by the plate 12. This feature provides a shape in which the foot is "pinched" in that it is narrower towards the outside edge 48 than the inside edge 46. Preferably, the width of the outer edge 48 is between 40% and 60% of the width of the inner edge 46.

The functional advantage that the "offset" gives to the clip 20 as a whole is that the installer of the cover 10 into the opening 200 of a box 100 has a longer cantilevered clip 20 to bend than a clip without an offset outer edge 48.

Further, the "pinched" effect of the foot makes the outer edge, or tip, of the foot more flexible than it would be without the pinched effect. Thus, the installer can more easily bend the foot into the shape exemplified in FIG. 7 to allow the bent clip to fall into the opening 200. Once all three clips are inserted into the opening of the box, the cover cannot simply be pulled away from the box without applying a force to the feet of the clips.

Method of Insertion.

Figure 1:
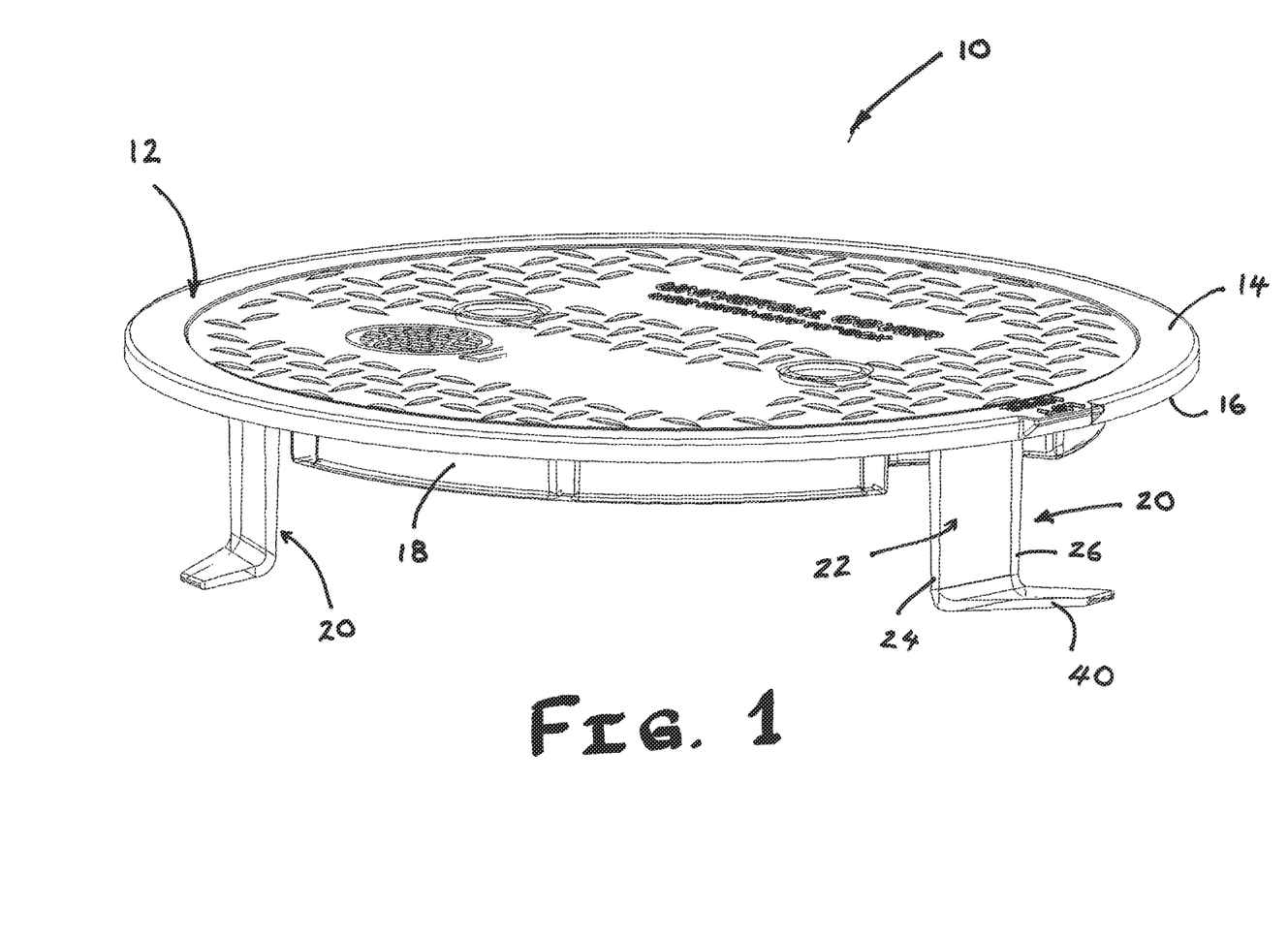
FIG. 1 is a perspective view from above and side of a universal cover of the present invention.
Figure 2:
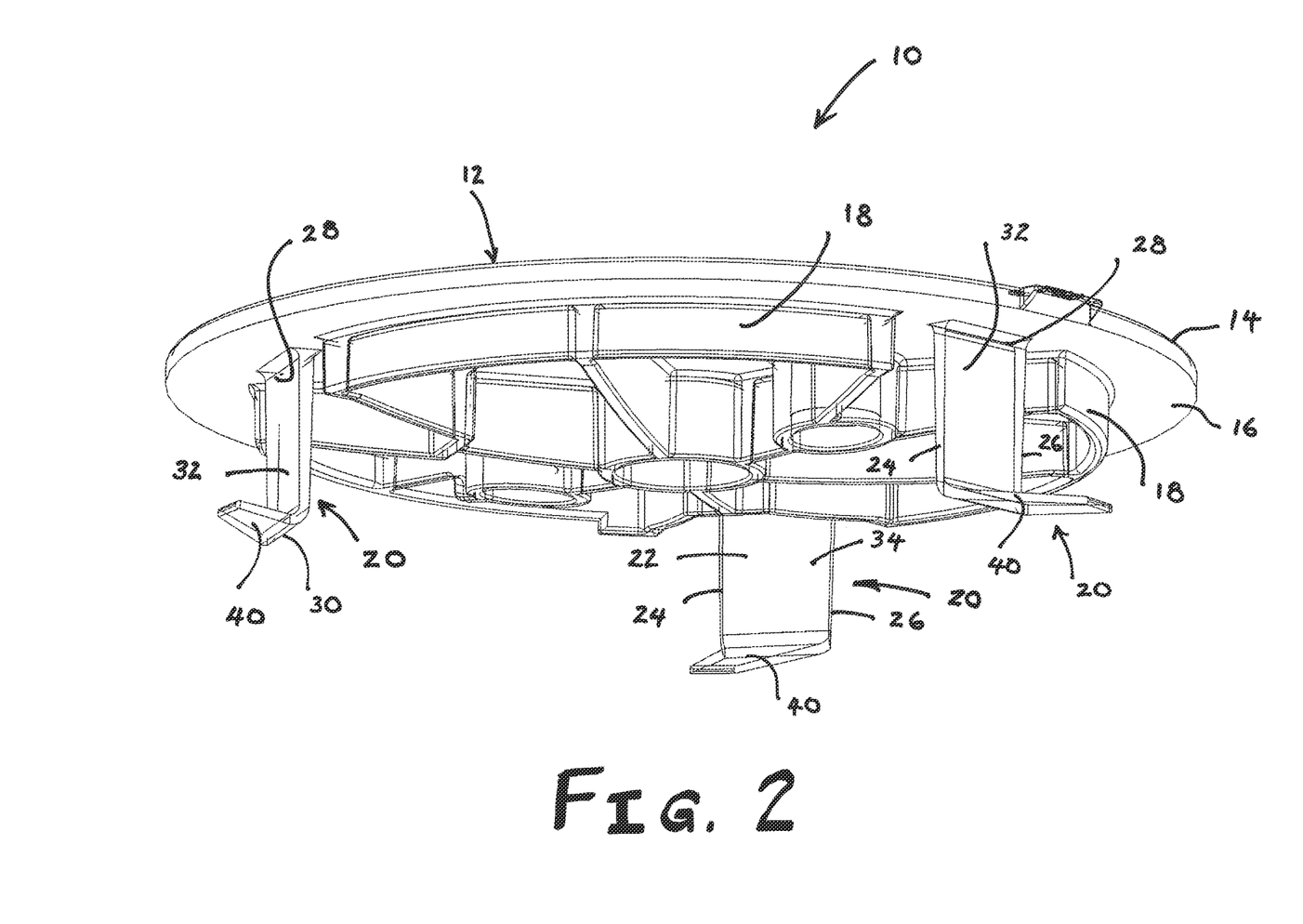
FIG. 2 is a perspective view from below and side of a universal cover of the present invention.
Figure 3:
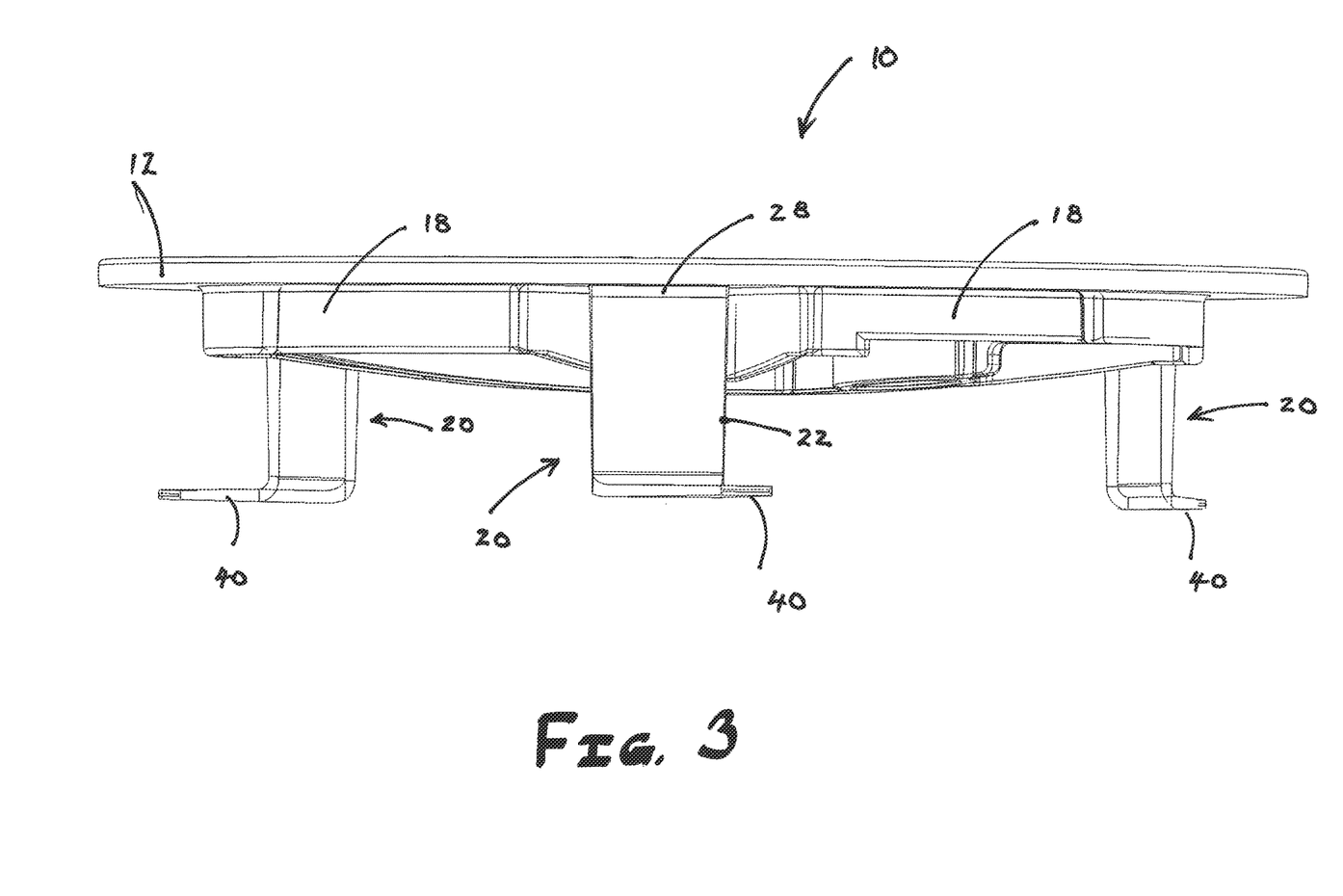
FIG. 3 is side elevational view of a universal cover of the present invention.
Figure 4:
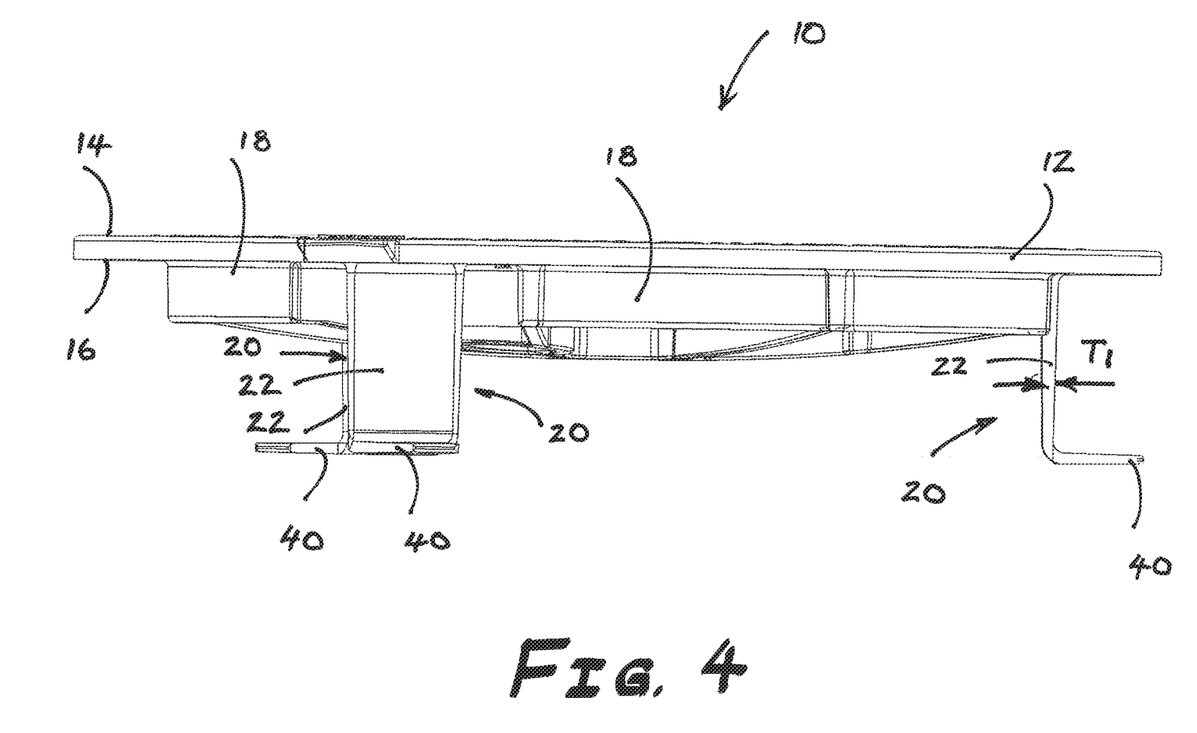
FIG. 4 is a side elevational view of a universal cover of the present invention, rotated at 60 degrees from the view in FIG. 3.
Figure 7:
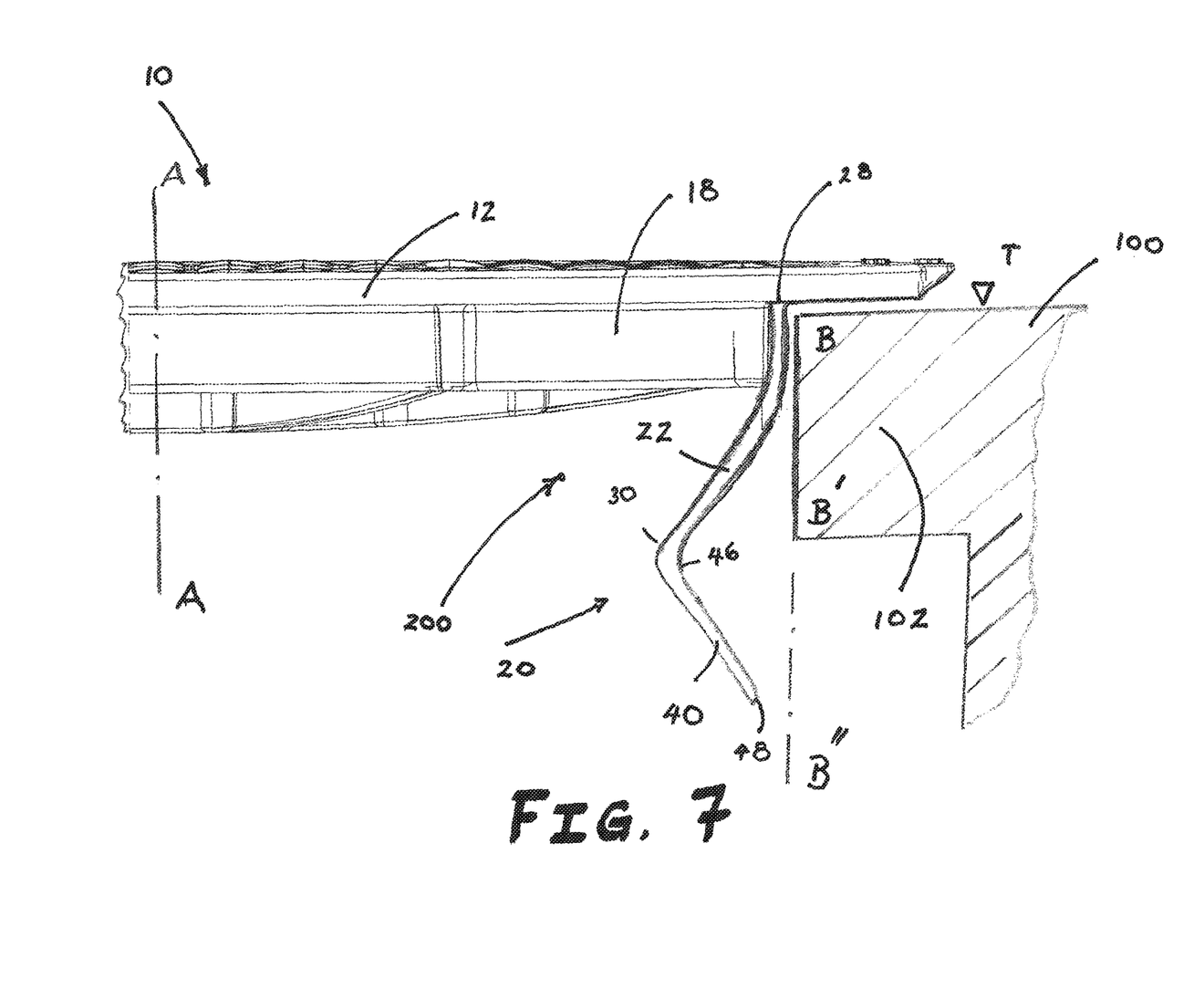
FIG. 7 is the view of FIG. 6, but with a portion of the cover shown in a bent downwardly configuration during installation.

Turning now to the method of inserting the clips 22 into their positions in the opening 200 of a landscape box 100 with at least a portion (at a minimum, D3) of each foot 40 under the flange 102 inside the opening, and in particular, under a point Z in relation to each foot 40, another important feature of the clip is its composition and thickness. As already mentioned, the entire cover 10 is molded from HDPE (high-density polyethylene) for greater flexibility and to eliminate cracking. This compares with the commonly used polypropylene which commonly constitutes many prior art covers, and which tends to be less flexible before cracking. It has been found that, when HDPE forms the basis of the cover 10, a thickness T1 (FIG. 4) of not less than 0.1 inch of each limb 22 and foot 40 has the desirable amount of flexibility to be bent inwards towards the center A-A of the box. The necessary extent of such bending is shown in FIG. 7 where it is seen that the radial tip "P" of the clip (marked in FIG. 6) coincides with the radial outer edge 48 (marked in FIG. 7) of the foot 40. The installer of the cover 10 onto the box 100 drops two rearward clips (these two clips are not shown in FIG. 6 and FIG. 7 but are shown in the other figures) into the opening 200 in the box 100 and pushes the cover 10 rearwards until the rearward clips prevent further movement. The installer then lowers the forwardly positioned third clip 20 (seen in FIGS. 6 and 7) towards and into the opening 200. while bending the tip 48, or outer edge, of the clip toward the centerline of the box A-A using the hands. As seen in FIG. 7, the tip 48 must be capable of being bent towards the center line A-A of the plate without breaking, until the tip is directly beneath the upper edge 28 of the limb 22 as shown in FIG. 7, and clears all points along the line B-B'-B" so as to avoid being blocked by the flange 102 on the downward movement. This capability, it will be appreciated, will allow the foot 40 of the clip 20 to freely move vertically downward past the flange 102 of the box 100 until it is free to snap forward again to its normal (i.e. unstressed) condition as that condition is shown in FIG. 6.

Thus, in the normal condition, in which the cover 10 is attached to the box 100, which is shown in FIG. 6, it will be appreciated that, so long as the point Z of the flange 102 is located above at least a portion D3 of each foot 40, the cover will be held in secure connection with the box 100 to the extent that the cover will not simply be knocked or blown away, but will encounter a retaining force before the cover 10 can be separated from the box 100. Accordingly, the design permits the installed cover 10 some freedom to "rattle" in its setting in the opening 200 of the box 100, with an amount of movement during this rattle which is dependent upon the location of the point Z on the box in relation to the center line A-A of the box, and in relation to the top level "T" of the box 100. The great advantage of the universal cover 10, is that it can, in a single easy movement (i.e. inserting the two rearward clips in the opening 200 and then deforming the forward clip before inserting it in the opening), be secured to almost every box style known of the same class without secondary problems being generated.

The removal of the cover 10 from the box is achieved by simply following a reverse series of steps. The installer simply raises the plate by a small amount sufficient to insert fingers under the bottom surface 16. The installer pushes the plate rearwardly, so that the rearward clips encounter the rear surface of the flange 102 in the box 100. At this point, the fingers are pushed into contact with the forward clip 20, which is then forced rearwardly until it achieves the bent configuration as shown in FIG. 7, with the entire clip lying rearward of the line B-B'-B". The plate 10 is then pulled upward, allowing the clip to clear the flange 102 and emerge out of the opening 200 in the box 100.

Turning now to the alternative embodiment of the horizontal edge 30' as seen in FIG. 8 and FIG. 9, this embodiment allows the installer, during the process of installation, to simply center the plate 10' over the center of the opening 200 of the box 100, and to force the plate 10' vertically downwards. It will be appreciated that each clip 20' will be symmetrically located in relation to the box and the opening of the box. Thus, forcing the plate downwards will cause the foot 40' of each clip to bend upwards, as shown in FIG. 9, and simultaneously to force the limb 22' to bend inwards towards the center of the plate. One of ordinary skill will understand that the sloping surface 33' will abut against the corner "B" of the box 100. The surface 33' provides an upward and inward force vector on the clip 20'. Thus, each of the clips 20' will be urged inwardly, with each foot being urged upwardly. Finally, when the clip has travelled sufficiently into the opening 200 of the box 100, the foot 40' of each clip will eventually snap downwardly into position as seen in FIG. 8, where it is able to act as a retention against removal of the plate 10 from the box 100. Removal of the plate may follow the same steps in reverse, wherein the plate is pulled vertically upward, thus forcing each foot 40' downwards and the limb 22' inwards. When the clip has been sufficiently deformed and elevated out of the opening 200, the foot will be able to snap into its normal horizontal position.

Thus, the design and method of the present invention allows for installation and removal of a cover onto a wide array of different shaped landscape boxes, with a simple set of hand movements.

Although preferred illustrative variations of the present invention are described above, it will be apparent to those skilled in the art that various changes and modifications may be made thereto without departing from the invention. For example, it will be appreciated that combinations of the features of different embodiments may be combined to form another embodiment. It is intended in the appended claims to cover all such changes and modifications that fall within the true spirit and scope of the invention.

We claim:

1. A universal cover for covering an opening in a landscape box, the universal cover comprising:
   a plate having an upper surface and a lower surface, a center point, and an outer perimeter;
   a plurality of clips for temporarily securing the plate in an opening in a landscape box, wherein each of the plurality of clips comprises:
   a limb extending vertically downward, the limb having the form of a rectangular plate and being upper bound by an upper edge and lower bound by a lower edge, wherein the upper edge is attached to the lower surface of the plate; and
   a foot extending horizontally sideways from the lower edge, and having the form of a quadrilateral plate with an upper surface and a lower surface, and being inner bound by an inner edge and outer bound by an outer edge, wherein the inner edge is connected to and coincident with the lower edge of the limb and wherein the outer edge is positioned a first distance from the center point and the inner edge is a second distance from the center point, the first distance being greater than the second distance;
   wherein, the plate is circular and wherein the plurality of clips is three and only three in number, wherein the upper edge of the limb of each of the plurality of clips lies on a single circumferential imaginary line that has the center point in common; and further
   wherein a center point on the outer edge lies on a first radial line of the circular plate, and a center point of the inner edge lies on a second radial line of the circular plate, and wherein the first radial line is offset between 10 degrees and 15 degrees from the second radial line.

2. The universal cover of claim 1, wherein the limb has a vertical length of between 1.5 and 2.0 inches in length.

3. The universal cover of claim 1, wherein the foot has a horizontal length measured along a radial line, of between 0.8 inches and 1.2 inches.

4. The universal cover of claim 1, wherein the limb has a thickness that is between 0.1 inches and 0.2 inches.

5. The universal cover of claim 1, wherein the outer edge has a first length and the inner edge has a second length, wherein the first length is between 40%-60% of the second length.

6. The universal cover of claim 1, further including stiffening ribs molded onto the lower surface of the plate, wherein the stiffening ribs are spaced apart from the plurality of clips to an extent that permits the plurality of clips to bend during installation of the cover without contacting any part of the stiffening ribs.

7. The universal cover of claim 1, wherein the foot is bounded by a first side edge and a second side edge, wherein the first side edge is not parallel with the second side edge, such that an imaginary straight line dawn extending along the first side edge and a second imaginary straight line drawn extending along the second side edge intersect at an imaginary point outside the outer perimeter of the plate.

8. The universal cover of claim 1, wherein the lower edge includes a downwardly projecting protrusion which extends below the lower surface of the foot by a certain distance, wherein the certain distance is between inch and % inch.

9. The universal cover of claim 8, wherein the downwardly projecting protrusion has a sloping surface which is exposed facing away from the center point of the plate, wherein the sloping surface is angled at between 40 degrees and 50 degrees from the vertical.

10. A universal cover for covering an opening in a landscape box, the universal cover comprising:
   a plate having an upper surface and a lower surface, a center point, and an outer perimeter;
   a plurality of clips for temporarily securing the plate in an opening in a landscape box, wherein each of the plurality of clips comprises:
   a limb extending vertically downward, the limb having the form of a rectangular plate and being upper bound by an upper edge and lower bound by a lower edge, wherein the upper edge is attached to the lower surface of the plate; and
   a foot extending horizontally sideways from the lower edge, and having the form of a quadrilateral plate with an upper surface and a lower surface, and being inner bound by an inner edge and outer bound by an outer edge, wherein the inner edge is connected to and coincident with the lower edge of the limb and wherein the outer edge is positioned a first distance from the center point and the inner edge is a second distance from the center point, the first distance being greater than the second distance; and further
   wherein the foot is bounded by a first side edge and a second side edge, wherein the first side edge is not parallel with the second side edge, such that an imaginary straight line dawn extending along the first side edge and a second imaginary straight line drawn extending along the second side edge intersect at an imaginary point outside the outer perimeter of the plate.

* * * * *

UNITED STATES PATENT AND TRADEMARK OFFICE
CERTIFICATE OF CORRECTION

PATENT NO. : 11,735,892 B2
APPLICATION NO. : 17/496181
DATED : August 22, 2023
INVENTOR(S) : David Rusch, Roberto Orozco and Ryan Larsen Page 1 of 1

It is certified that error appears in the above-identified patent and that said Letters Patent is hereby corrected as shown below:

In the Claims

Column 10, Line 13, Claim 8:
Currently Reads:
The universal cover of claim 1, wherein the lower edge includes a downwardly projecting protrusion which extends below the lower surface of the foot by a certain distance, wherein the certain distance is between inch and% inch.

Should Read:
The universal cover of claim 1, wherein the lower edge includes a downwardly projecting protrusion which extends below the lower surface of the foot by a certain distance, wherein the certain distance is between 1/4 inch and % inch.

Signed and Sealed this
Twenty-fifth Day of March, 2025

Coke Morgan Stewart
*Acting Director of the United States Patent and Trademark Office*